(12) United States Patent
Chen et al.

(10) Patent No.: US 12,087,046 B2
(45) Date of Patent: Sep. 10, 2024

(54) METHOD FOR FINE-GRAINED DETECTION OF DRIVER DISTRACTION BASED ON UNSUPERVISED LEARNING

(71) Applicant: Anhui University, Hefei (CN)

(72) Inventors: Jie Chen, Hefei (CN); Bing Li, Hefei (CN); Zihan Cheng, Hefei (CN); Haitao Wang, Hefei (CN); Jingmin Xi, Hefei (CN); Yingjian Deng, Hefei (CN)

(73) Assignee: Anhui University, Hefei (CN)

( * ) Notice: Subject to any disclaimer, the term of this patent is extended or adjusted under 35 U.S.C. 154(b) by 385 days.

(21) Appl. No.: 17/661,177

(22) Filed: Apr. 28, 2022

(65) Prior Publication Data
US 2023/0186436 A1    Jun. 15, 2023

(30) Foreign Application Priority Data

Dec. 14, 2021 (CN) .......................... 202111527027.2

(51) Int. Cl.
*G06V 10/82* (2022.01)
*G06V 20/59* (2022.01)
*G06V 20/70* (2022.01)

(52) U.S. Cl.
CPC ............ *G06V 10/82* (2022.01); *G06V 20/597* (2022.01); *G06V 20/70* (2022.01)

(58) Field of Classification Search
CPC ....... G06V 10/82; G06V 20/70; G06V 20/597
See application file for complete search history.

(56) References Cited

U.S. PATENT DOCUMENTS

| | | | |
|---|---|---|---|
| 10,246,014 B2 * | 4/2019 | Levkova | B60Q 9/00 |
| 2023/0116453 A1 * | 4/2023 | Sanchez | G06N 20/00 |
| | | | 701/1 |

(Continued)

FOREIGN PATENT DOCUMENTS

CN    116092058 A   *   5/2023

OTHER PUBLICATIONS

Leekha, Maitree, et al. "Are you paying attention? Detecting distracted driving in real-time." 2019 IEEE Fifth International Conference on Multimedia Big Data (BigMM) IEEE (Year: 2019).*

(Continued)

*Primary Examiner* — Scott A Rogers
(74) *Attorney, Agent, or Firm* — DLA PIPER LLP (US)

(57) ABSTRACT

The present disclosure provides a method for fine-grained detection of driver distraction based on unsupervised learning, belonging to the field of driving behavior analysis. The method includes: acquiring distracted driving image data; and inputting the acquired distracted driving image data into an unsupervised learning detection model, analyzing the distracted driving image data by using the unsupervised learning detection model, and determining a driver distraction state according to an analysis result. The unsupervised learning detection model includes a backbone network, projection heads, and a loss function; the backbone network is a RepMLP network structure incorporating a multilayer perceptron (MLP); the projection heads are each an MLP incorporating a residual structure; and the loss function is a loss function based on contrastive learning and a stop-gradient strategy.

10 Claims, 3 Drawing Sheets

(56) References Cited

U.S. PATENT DOCUMENTS

| | | | | |
|---|---|---|---|---|
| 2023/0186652 A1* | 6/2023 | Chen | ............... | B60W 40/09 |
| | | | | 382/100 |
| 2023/0347907 A1* | 11/2023 | Sanchez | ............... | B60W 40/09 |
| 2024/0037665 A1* | 2/2024 | Sanchez | ............... | G06N 20/00 |

OTHER PUBLICATIONS

Hossain, Md Uzzol, et al. "Automatic driver distraction detection using deep convolutional neural networks." Intelligent Systems with Applications 14: 200075 (Year: 2022).*

Zhang, Yuxin, Yiqiang Chen, and Chenlong Gao. "Deep unsupervised multi-modal fusion network for detecting driver distraction." Neurocomputing 421: 26-38 (Year: 2021).*

Tavakoli, Arash, and Arsalan Heydarian. "Multimodal driver state modeling through unsupervised learning." Accident Analysis & Prevention 170: 106640 (Year: 2022).*

Li, Bing, et al. "A new unsupervised deep learning algorithm for fine-grained detection of driver distraction", IEEE Transactions on Intelligent Transportation Systems 23(10): 19272-19284 (Year: 2022).*

Qiu, Yuning, Teruhisa Misu, and Carlos Busso. "Unsupervised scalable multimodal driving anomaly detection." IEEE Transactions on Intelligent Vehicles 8(4): 3154-3165 (Year: 2022).*

* cited by examiner

METHOD FOR FINE-GRAINED DETECTION OF DRIVER DISTRACTION BASED ON UNSUPERVISED LEARNING

CROSS REFERENCE TO RELATED APPLICATION

This application claims priority to Chinese Patent Application No. 202111527027.2, filed on Dec. 14, 2021, which is herein incorporated by reference in its entirety.

TECHNICAL FIELD

The present disclosure relates to the field of driving behavior analysis, and in particular, to a method for fine-grained detection of driver distraction based on unsupervised learning.

BACKGROUND ART

In today's world, with the development of technology and economy, people's living standard has been greatly improved. In order to meet the growing demand for travel, the number of vehicles worldwide has also increased year by year. Although autonomous driving has developed rapidly in recent years, there is still a long way to go before full coverage and complete self-driving are achieved. Therefore, current vehicles on the road are still mainly manually driven vehicles. However, unlike a machine, a driver cannot concentrate on driving all the time, but is distracted from time to time, e.g., talking on the phone, sending messages, and talking to others. Research reports show that accidents caused by distracted driving account for a large portion of the total number of traffic accidents worldwide every year. For example, the World Health Organization reported that about 1.35 million people died in traffic accidents worldwide in 2018, and the main causes of these accidents were driving violations and other interference factors, including talking on the phone, sending messages, and communicating with others, etc. Therefore, how to detect a driver's state in real time and give corresponding instructions according to the driver's state so as to reduce distracted driving of the driving and reduce various accidents caused by the distracted driving is an important research direction. Moreover, according to the current industry development trend, the development of more advanced driver assistance systems (ADAS) for driver safety driving is of higher application value, which is an important transition link and product to achieve the high-level autonomous driving in the future.

(1) The traditional machine learning method for detecting driver distraction mainly includes manually selecting key features, and determining whether the driver is distracted based on a combination of the key features and classifiers. Such a method is relatively simple, but the biggest drawback is that the manually selected features lack universality and are difficult to adapt to all driving scenarios.

(2) Mainstream research solutions at present mainly use supervised convolutional neural network (CNN) models (such as VGG16, ResNet50, AlexNet, InceptionV3, etc.) to detect the driver's state. These schemes achieve good results, but require a large amount of labeled data for model training. As is known to all, labeling a huge amount of data requires a lot of human and material resources, and training a model requires a large amount of data, which invariably makes it difficult to train a model using a supervised approach. Therefore, it is difficult to put the supervised approach into practice in the present disclosure.

(3) The supervised driver distraction detection framework represented by CNN requires a large amount of reliable labeled data to train the model, which is difficult to cover all driving scenes, with limited generalization performance and weak iterability. In addition, the technical idea of supervised learning still belongs to the category of weak artificial intelligence, with a low level of human-like intelligence. Therefore, it is necessary to develop a strong artificial intelligence technology and method that have a higher level of human-like intelligence.

(4) The existing supervised models mainly use a CNN as the main framework, which is formed by stacking multiple convolutional layers. The biggest advantage of the CNN is that it learns and combines local parts of images through convolutional kernels of a certain size. The CNN achieves strong local perception, but has weak global perception. However, the various distraction states of drivers in actual driving scenes are highly correlated with global scenes. Therefore, it is difficult to characterize actual driving states of drivers well by focusing only on local information.

To this end, in response to the above key problems in driver distraction detection, the present disclosure proposes a novel method to apply to real-life driver distraction detection.

SUMMARY

To overcome the deficiencies in the prior art, the present disclosure provides a method for fine-grained detection of driver distraction based on unsupervised learning.

To achieve the objective above, the present disclosure provides the following technical solutions.

A method for fine-grained detection of driver distraction based on unsupervised learning is provided, including the following steps:
  acquiring distracted driving image data; and
  inputting the acquired distracted driving image data into an unsupervised learning detection model, analyzing the distracted driving image data by using the unsupervised learning detection model, and determining a driver distraction state according to an analysis result, where
  the unsupervised learning detection model includes a backbone network, projection heads, and a loss function;
  the backbone network is a RepMLP network structure incorporating a multilayer perceptron (MLP);
  the projection heads are each an MLP incorporating a residual structure; and
  the loss function is a loss function based on contrastive learning and a stop-gradient strategy.

Preferably, the distracted driving image data in different driving scenes is acquired by using an in-vehicle camera.

Preferably, the driver distraction state includes: a driver texting with left/right hand, talking on the phone with left/right hand holding the phone, operating a radio, drinking, looking backwards, fixing hair, and talking to a passenger.

Preferably, before the distracted driving image data is analyzed by using the unsupervised learning detection model, 10% of the distracted driving image data is labeled, including: labeling target position information and class information of images, to obtain a label file; and then inputting unlabeled distracted driving image data and the label file into the unsupervised learning detection model to train the model.

Preferably, the projection head includes 3 fully connected layers, the first fully connected layer is cascaded with the second fully connected layer, and a sum of an input of the first fully connected layer and an output of the second fully connected layer is used as an input of the third fully connected layer.

Preferably, the loss function is constructed through the following steps:
 performing two data augmentations on the distracted driving image data;
 inputting images after the data augmentations into the backbone network for processing;
 inputting an output of the backbone network to different projection heads for processing; and
 constructing the loss function according to outputs of the different projection heads.

Preferably, the loss function L is formed by a loss function $L_{similarity}$ in contrastive learning and a loss function $L_{stop-grad}$ based on the stop-gradient strategy:

$$L = L_{similarity} + L_{stop-grad} \quad (1)$$

where $$L_{similarity} = \frac{1}{2N}\sum_{K=1}^{N}\left[-\log\frac{\exp\left(\frac{X_{k1}^T X_{k2}}{\|X_{k1}^T\|\,\|X_{k2}^T\|\tau}\right)}{\sum_i^N \sum_{v=1}^{2}\exp\left(\frac{X_{iv}^T X_{K2}}{\|X_{iv}\|\,\|X_{k2}^T\|\tau}\right)}(iv \neq k2) - \log\frac{\exp\left(\frac{X_{k2}^T X_{k1}}{\|X_{k2}^T\|\,\|X_{k1}^T\|\tau}\right)}{\sum_i^N \sum_{v=1}^{2}\exp\left(\frac{X_{iv}^T X_{K2}}{\|X_{iv}^T\|\,\|X_{k1}\|\tau}\right)}(iv \neq k1)\right] \quad (2)$$

where in formula (2):
r is a temperature coefficient;
N is the quantity of images in one batch size;
v is an integer variable that varies in a range of [1, 2];
k is an integer variable that varies in a range of [1, N];
i is an integer variable that varies in a range of [1, N];
$X_{k1}$ and $X_{k2}$ represent feature vectors obtained after an image $X_k$, which has been and subject to two data augmentations, passes through the backbone network and two projection heads;

$$X_{k1} = z(h(f(transforms(X_k)))) \quad (3)$$

$$X_{k2} = z(h(f(transforms(X_k)))) \quad (4)$$

$$L_{stop-grad} = \quad (5)$$
$$-\frac{1}{2}\left(\frac{X_{k1}}{\|X_{k1}\|_2} \cdot \frac{stop-grad(X'_{k2})}{\|stop-grad(X'_{k2})\|_2} + \frac{X_{k2}}{\|X_{k2}\|_2} \cdot \frac{stop-grad(X'_{k1})}{\|stop-grad(X'_{k1})\|_2}\right)$$

where $\|\cdot\|_2$ in formula (5) represents normalization $l_2$-norm;
a relationship between $X_{k1}$ and $X'_{k1}$, and a relationship between $X_{k2}$ and $X'_{k2}$ are shown in formula (8) and formula (9), respectively;

$$X'_{k1} = h(f(transforms(X_k))) \quad (6)$$

$$X'_{k2} = h(f(transforms(X_k))) \quad (7)$$

$$X_{k1} = z(X'_{k1}) \quad (8)$$

$$X_{k2} = z(X'_{k2}) \quad (9).$$

Preferably, before the loss function is constructed, a data augmentation is performed on the distracted driving image data, where the data augmentation includes:
 randomly cropping distracted driving images;
 inverting the cropped images and modifying brightness and saturation of the images; and
 converting the modified images to grayscale maps, and performing Gaussian blurring and normalization.

Preferably, each single block in the backbone network is constructed through the following steps:
 cascading a 1×1 convolution and a 3×3 convolution;
 inputting an output of a 3×3 convolutional layer to a pooling layer;
 inputting an output of a pooling layer to a two-layer MLP structure;
 adding up an output of the MLP structure and the output of the 3×3 convolutional layer to obtain a new feature map;
 separately inputting the new feature map to a fully connected layer, a 1×1 convolutional layer, a 3×3 convolutional layer, and a 5×5 convolutional layer;
 adding up outputs of the convolutional layers to another new feature map; and
 inputting the other new feature map to a 3×3 convolutional layer, and then inputting an output of the 3×3 convolutional layer to a 1×1 convolutional layer.

Preferably, the distracted driving image data is analyzed by using the unsupervised learning detection model, to obtain a distraction detection result for assisting a driver in safe driving.

The method for fine-grained detection of driver distraction based on unsupervised learning provided by the present disclosure has the following beneficial effects:

(1) To address the low generalization of the existing supervised learning method and huge labor consumption of data labeling, the present disclosure innovatively introduces an unsupervised learning method to maximize the use of massive unlabeled driving scene data, which is more conducive to industry applications.

(2) In response to the characteristics of driver distraction detection tasks and to overcome the shortage of global feature capture capability of the existing CNN framework, the present disclosure optimizes the design of the adopted unsupervised detection framework and adopts a backbone network incorporating an MLP structure. The present disclosure solves the problem of poor global perception of the traditional CNN model formed by stacked convolutional layers. Therefore, the new backbone network adopted in the present disclosure has not only strong local perception, but also good global perception performance. This new backbone network can enhance the generalization ability of the unsupervised learning detection model to application scenarios, which is more conducive to applying the method of the present disclosure to various scenarios of driver distraction detection in real life. The application of this new backbone network in the field of non-supervision lays the foundation for the further integration of the MLP and unsupervised learning.

(3) The present disclosure introduces the idea of residual into projection heads of the unsupervised framework to avoid the feature degradation caused by the increase in layers of projection heads and to improve the deep feature extraction capability of unsupervised learning detection model, thereby better characterizing driver distraction behaviors and improve distraction detection accuracy.

(4) The present disclosure combines contrastive learning with a stop-gradient (stopgrad) strategy to design a new unsupervised learning loss function, which enables the model to better learn robust features and improve the generalization performance of the model.

(5) The present disclosure avoids the need to label a large amount of data for model training in previous driver distraction detection. By constructing a new unsupervised learning paradigm, the present disclosure detects the driving state of the driver by using the unsupervised learning method. This reduces the amount of data labeling while completing driver distraction detection.

BRIEF DESCRIPTION OF THE DRAWINGS

In order to illustrate the embodiments and design solutions of the present disclosure more clearly, accompanying drawings of the embodiments will be briefly introduced below. The accompanying drawings in the following description show merely some embodiments of the present disclosure, and other drawings may be derived from these accompanying drawings by a person of ordinary skill in the art without creative efforts.

DETAILED DESCRIPTION OF THE EMBODIMENTS

To enable those skilled in the art to better understand and implement the technical solutions of the present disclosure, the present disclosure is described below in detail with reference to the accompanying drawings and specific embodiments. The following embodiments are only used for describing the technical solutions of the present disclosure more clearly, and are not intended to limit the protection scope of the present disclosure.

Embodiment 1

Figure 1:
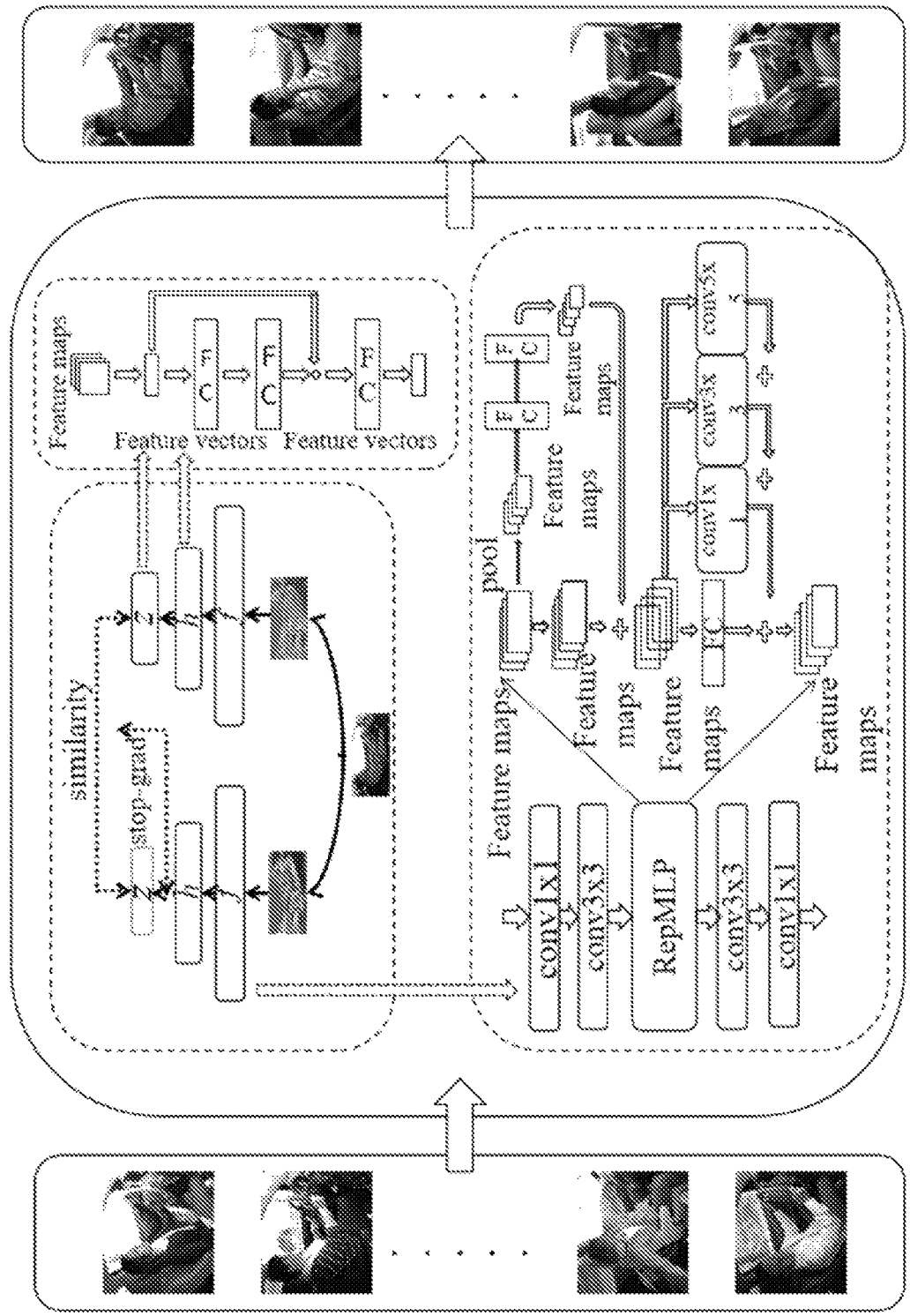
FIG. 1 is a flowchart of a method for fine-grained detection of driver distraction based on unsupervised learning according to Embodiment 1 of the present disclosure.

The present disclosure provides a method for fine-grained detection of driver distraction based on unsupervised learning. Specifically, as shown in FIG. 1, the method includes the following steps:

Step 1: Acquire distracted driving image data. Specifically, the distracted driving image data in different driving scenes is acquired by using an in-vehicle camera, including: safe driving, talking on the phone, and exchanging data with others.

Step 2: Input the acquired distracted driving image data into an unsupervised learning detection model, analyze the distracted driving image data by using the unsupervised learning detection model, and determine a driver distraction state according to an analysis result. The driver distraction state includes: a driver texting with left/right hand, talking on the phone with left/right hand holding the phone, operating a radio, drinking, looking backwards, fixing hair, and talking to a passenger.

Before the distracted driving image data is analyzed by using the unsupervised learning detection model, 10% of the distracted driving image data is labeled, including: labeling target position information and class information of images to obtain a label file; and then inputting unlabeled distracted driving image data and the label file into the unsupervised learning detection model to train the model.

The distracted driving image data is analyzed by using the unsupervised learning detection model of this embodiment, to obtain a distraction detection result for assisting a driver in safe driving.

In this embodiment, the unsupervised learning detection model uses the RepMLP network structure incorporating the MLP as the backbone network, uses the MLP incorporating the residual structure as the projection head, and uses the loss function based on the contrastive learning and the stop-gradient (stopgrad) strategy as the loss function of the whole unsupervised framework. Each part is described in detail below.

The unsupervised learning detection model provided by the present disclosure mainly includes one backbone network, two projection heads, and an unsupervised loss function designed in the present disclosure.

Figure 3:
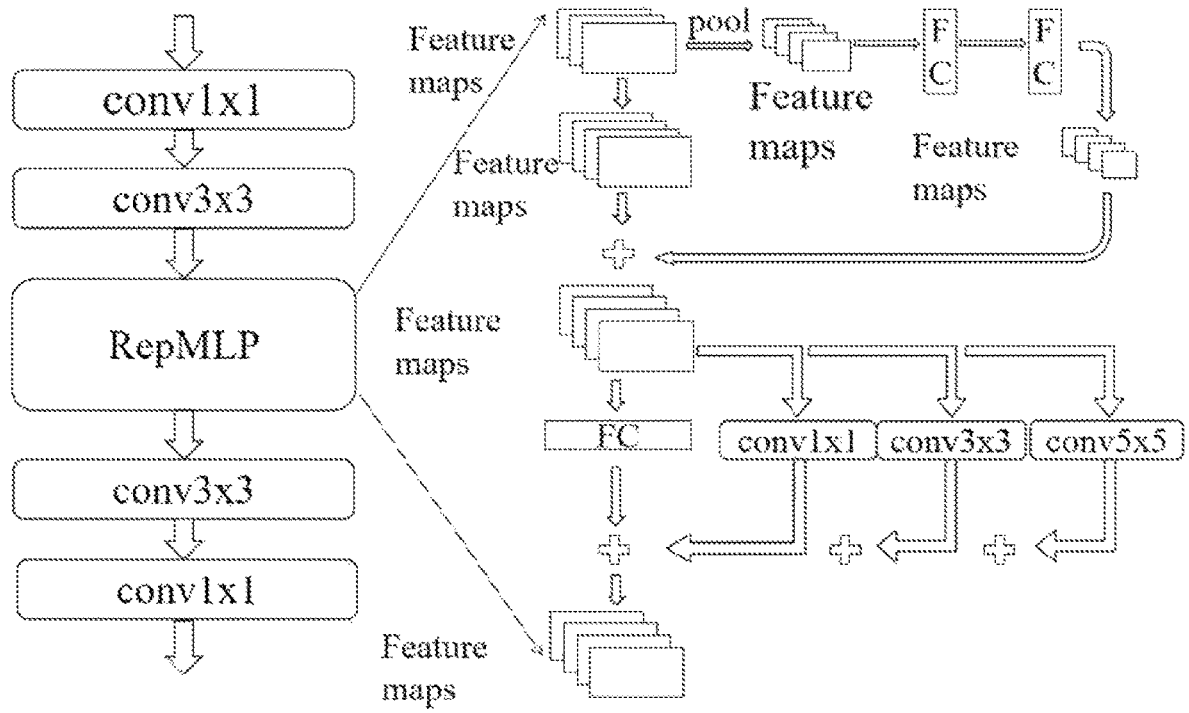
FIG. 3 is a framework diagram of a backbone network.

FIG. 3 shows the design of a block in the backbone network. In the figure, FC represents a fully connected layer, conv1×1 represents a 1×1 convolutional layer, conv3×3 represents a 3×3 convolutional layer, conv5×5 represents a 5×5 convolutional layer, and pool represents a pooling layer. The backbone network adopts the RepMLP network structure. First, image features are extracted through convolutions, and then global perception is achieved through full connections, so that the performance of the unsupervised learning detection model is improved. The image feature is a feature matrix formed by feature vectors.

In the present disclosure, a residual network ResNet50 is used as a basic backbone network. Then, RepMLP (re-parameterizing convolutional layer) is used as a new block to replace some of blocks in the ResNet50 (4 residual stages of the ResNet50 are defined as s1, s2, s3, and s4 respectively, and s2 and s3 in the ResNet50 are replaced with the new blocks). In this embodiment, a block is a small portion in the backbone network, and a plurality of blocks form one backbone network. The structure of the new block is formed in the following manner: first cascading a 1×1 convolution and a 3×3 convolution, then inputting an output of the 3×3 convolutional layer to a pooling layer, next inputting an output of the pooling layer to a two-layer MLP structure, and further adding up an output of the MLP structure and the output of the 3×3 convolutional layer to obtain a new feature map. Then, the new feature map is separately inputted to a fully connected layer, a 1×1 convolutional layer, a 3×3 convolutional layer, and a 5×5 convolutional layer; outputs of these layers are added up to obtain another new feature map. Finally, the other new feature map is inputted to a 3×3 convolutional layer, and an output of the 3×3 convolutional layer is further inputted to a 1×1 convolutional layer.

Figure 4:
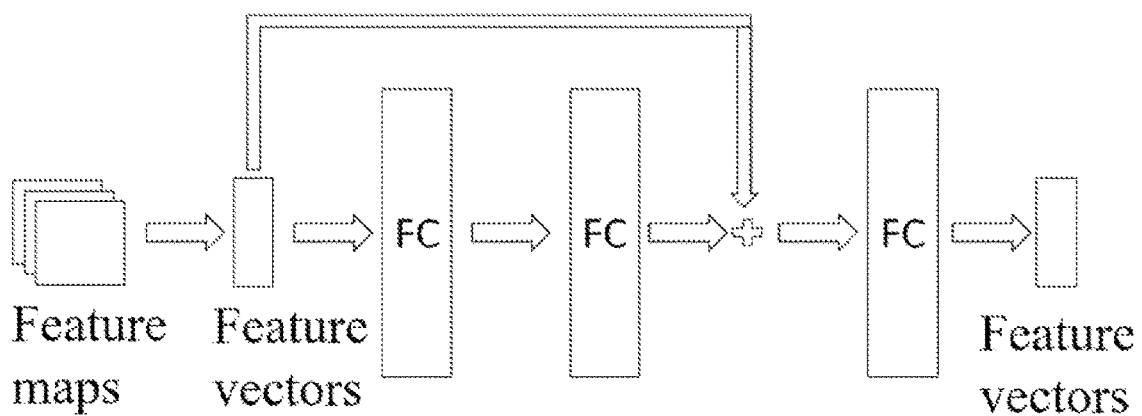
FIG. 4 is a framework diagram of a projection head.

FIG. 4 shows the design of a projection head. FC in the figure represents a fully connected layer. The stacking of a plurality of fully connected layers will cause degradation of original features, thus affecting the precision of the model. To solve this problem, the present disclosure adopts a residual structure to make up for the feature degradation, thereby further improving the precision of the model. The projection head mainly includes 3 fully connected layers, the first fully connected layer is cascaded with the second fully connected layer, and a sum of an input of the first fully connected layer and an output of the second fully connected layer is used as an input of the third fully connected layer.

Figure 2:
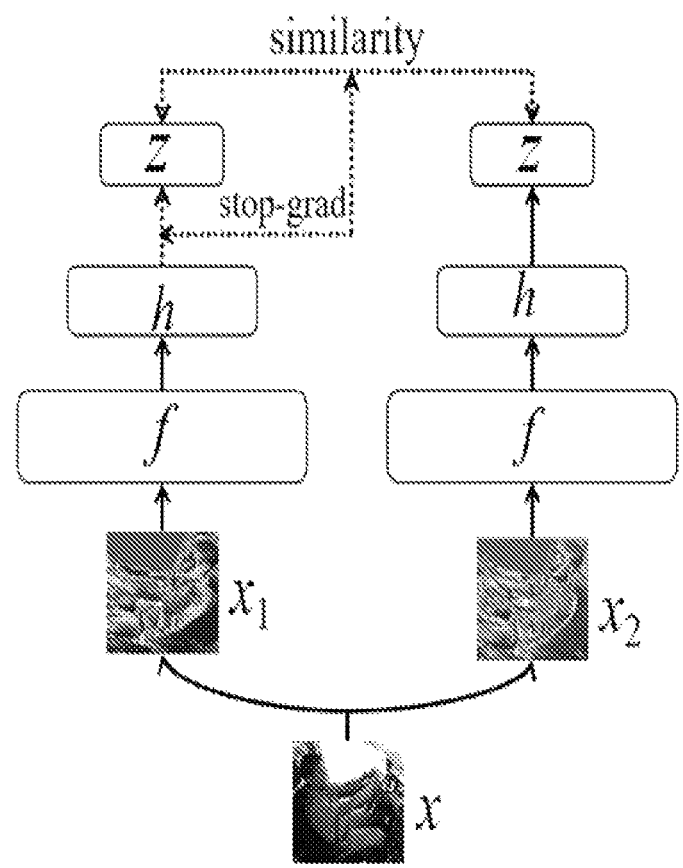
FIG. 2 is a framework diagram of an unsupervised learning detection model.

As shown in FIG. 2, the loss function in this embodiment is constructed through the following steps:

(1) An image that has been subject to two data augmentations is inputted to the model (data is augmented before the loss function is constructed, where the data augmentation includes: random cropping, random horizontal flipping, modification of image brightness and saturation with a certain probability, conversion to a grayscale map with a certain probability, Gaussian blurring and normalization with a certain probability; finally, an augmented image is obtained).

(2) The augmented image is inputted to the backbone network f to obtain two different feature maps, and then the two feature maps are inputted to the first projection head h to obtain two feature vectors; finally, the two feature vectors outputted from the first projection head h are inputted to the second projection head z to obtain two final feature vectors.

(3) The structure of the corresponding loss function is obtained by performing calculation on the feature vectors from the first projection head h and the feature vectors from the second projection head z. The loss function is used to train the whole model.

In FIG. 2, x represents an input image, $x_1$ and $x_2$ represent images obtained by performing the data augmentation on the original image after (random cropping, random horizontal flipping, modification of image brightness and saturation with a certain probability, conversion to a grayscale map with a certain probability, and Gaussian blurring and normalization with a certain probability). f represents the backbone network; h and z represent the projection heads.

Specifically, the loss function L is formed by a loss function $L_{similarity}$ in contrastive learning and a loss function $L_{stop-grad}$ on the stop-gradient strategy:

$$L = L_{similarity} + L_{stop-grad} \quad (1)$$

where $$L_{similarity} = \frac{1}{2N}\sum_{K=1}^{N}\left[-\log\frac{\exp\left(\frac{X_{k1}^T X_{k2}}{\|X_k^T\|\,\|X_{k2}\|\tau}\right)}{\sum_i^N\sum_{v=1}^{2}\exp\left(\frac{X_{iv}^T X_{K2}}{\|X_{iv}\|\,\|X_{k2}^T\|\tau}\right)}(iv \neq k2)\right.$$

$$\left.-\log\frac{\exp\left(\frac{X_{k2}^T X_{k1}}{\|X_{k2}^T\|\,\|X_{k1}^T\|\tau}\right)}{\sum_i^N\sum_{v=1}^{2}\exp\left(\frac{X_{iv}^T X_{K2}}{\|X_{iv}^T\|\,\|X_{k1}\|\tau}\right)}(iv \neq k1)\right] \quad (2)$$

where in formula (2):

τ is a temperature coefficient;
N is the quantity of images in one batch size;
v is an integer variable that varies in a range of [1, 2];
k is an integer variable that varies in a range of [1, N];
i is an integer variable that varies in a range of [1, N];
$X_{k1}$ and $X_{k2}$ represent feature vectors obtained after an image $X_k$, which has been and subject to two data augmentations, passes through the backbone network and two projection heads;

$$X_{k1} = z(h(f(\text{transforms}(X_k)))) \quad (3)$$

$$X_{k2} = z(h(f(\text{transforms}(X_k)))) \quad (4)$$

$$L_{stop-grad} = \quad (5)$$

$$-\frac{1}{2}\left(\frac{X_{k1}}{\|X_{k1}\|_2}\cdot\frac{stop-grad(X_{k2}')}{\|stop-grad(X_{k2}')\|_2} + \frac{X_{k2}}{\|X_{k2}\|_2}\cdot\frac{stop-grad(X_{k1}')}{\|stop-grad(X_{k1}')\|_2}\right)$$

where $\|\cdot\|$ in formula (5) represents normalization $l_2$-norm; a relationship between $X_{k1}$ and $X'_{k1}$, and a relationship between $X_{k2}$ and $X'_{k2}$ an are shown in formula (8) and formula (9), respectively;

$$X'_{k1} = h(f(\text{transforms}(X_k))) \quad (6)$$

$$X'_{k2} = h(f(\text{transforms}(X_k))) \quad (7)$$

$$X_{k1} = z(X'_{k1}) \quad (8)$$

$$X_{k2} = z(X'_{k2}) \quad (9).$$

The unsupervised learning detection model of this embodiment specifically uses the backbone network to detect the driving state of the driver. Specifically, a fine-tuned backbone network is used to detect the driving state of the driver. That is, image data of the driving state in different scenes is inputted to the fine-tuned backbone network, and then feature vectors outputted from the backbone network are used to detect and identify driving distraction.

In the present invention, a large amount of unlabeled data about driver distraction is acquired, then the unsupervised learning detection model proposed in the present disclosure is trained by using such data, and the trained model is transplanted to a deep learning development board, which can be used in various types of vehicles to detect the driving state of the vehicle driver, to ensure safe driving of the driver. The new unsupervised learning detection model proposed in the present disclosure achieves a higher level of human-like intelligence. This model can greatly reduce the amount of labeled data required for the training of the unsupervised learning detection model, and can make full use of a large amount of unlabeled data, thereby saving a lot of manpower and material resources.

The above are merely preferred specific embodiments of the present disclosure, and the scope of protection of the present disclosure is not limited to this. All simple variations or equivalent substitutions of the technical solution readily obtained by any person skilled in the art within the technical scope disclosed by the present disclosure should fall within the protection scope of the present disclosure.

What is claimed is:

1. A method for fine-grained detection of driver distraction based on unsupervised learning, comprising the following steps:
   acquiring distracted driving image data; and
   inputting the acquired distracted driving image data into an unsupervised learning detection model, analyzing the distracted driving image data by using the unsupervised learning detection model, and determining a driver distraction state according to an analysis result, wherein
   the unsupervised learning detection model comprises a backbone network, projection heads, and a loss function;
   the backbone network is a RepMLP network structure incorporating a multilayer perceptron (MLP);
   the projection heads are each an MLP incorporating a residual structure; and
   the loss function is a loss function based on contrastive learning and a stop-gradient strategy.

2. The method for fine-grained detection of driver distraction based on unsupervised learning according to claim 1, wherein the distracted driving image data in different driving scenes is acquired by using an in-vehicle camera.

3. The method for fine-grained detection of driver distraction based on unsupervised learning according to claim 1, wherein the driver distraction state comprises: a driver texting with left/right hand, talking on the phone with left/right hand holding a phone, operating a radio, drinking, looking backwards, fixing hair, and talking to a passenger.

4. The method for fine-grained detection of driver distraction based on unsupervised learning according to claim 2, wherein before the distracted driving image data is analyzed by using the unsupervised learning detection model, 10% of the distracted driving image data is labeled, comprising: labeling target position information and class information of images, to obtain a label file; and then inputting unlabeled distracted driving image data and the label file into the unsupervised learning detection model to train the model.

5. The method for fine-grained detection of driver distraction based on unsupervised learning according to claim 1, wherein the projection head comprises 3 fully connected layers, a first fully connected layer is cascaded with a second fully connected layer, and a sum of an input of the first fully connected layer and an output of the second fully connected layer is used as an input of a third fully connected layer.

6. The method for fine-grained detection of driver distraction based on unsupervised learning according to claim 5, wherein the loss function is constructed through the following steps:
performing two data augmentations on the distracted driving image data;
inputting images after the data augmentations into the backbone network for processing;
inputting an output of the backbone network to different projection heads for processing; and
constructing the loss function according to outputs of the different projection heads.

7. The method for fine-grained detection of driver distraction based on unsupervised learning according to claim 6, wherein a loss function L is formed by a loss function $L_{similarity}$ in contrastive learning and a loss function $L_{stop\text{-}grad}$ based on the stop-gradient strategy:

$$L = L_{similarity} + L_{stop\text{-}grad} \quad (1)$$

wherein $$L_{similarity} = \frac{1}{2N} \sum_{K=1}^{N} \left[ -\log \frac{\exp\left(\frac{X_{k1}^T X_{k2}}{\|X_{k1}^T\| \|X_{k2}\|\tau}\right)}{\sum_{i}^{N} \sum_{v=1}^{2} \exp\left(\frac{X_{iv}^T X_{K2}}{\|X_{iv}\| \|X_{k2}^T\|\tau}\right)} (iv \neq k2) - \log \frac{\exp\left(\frac{X_{k2}^T X_{k1}}{\|X_{k2}^T\| \|X_{k1}^T\|\tau}\right)}{\sum_{i}^{N} \sum_{v=1}^{2} \exp\left(\frac{X_{iv}^T X_{K2}}{\|X_{iv}^T\| \|X_{k1}\|\tau}\right)} (iv \neq k1) \right] \quad (2)$$

wherein in formula (2):
τ is a temperature coefficient;
N is a quantity of images in one batch size;
v is an integer variable that varies in a range of [1, 2];
k is an integer variable that varies in a range of [1, N];
i is an integer variable that varies in a range of [1, N];

$X_{k1}$ and $X_{k2}$ represent feature vectors obtained after an image $X_k$, which has been subject to two data augmentations, passes through the backbone network and two projection heads;

$$X_{k1} = z(h(f(\text{transforms}(X_k)))) \quad (3)$$

$$X_{k2} = z(h(f(\text{transforms}(X_k)))) \quad (4)$$

$$L_{stop\text{-}grad} = \quad (5)$$
$$-\frac{1}{2}\left(\frac{X_{k1}}{\|X_{k1}\|_2} \cdot \frac{\text{stop} - grad(X'_{k2})}{\|\text{stop} - grad(X'_{k2})\|_2} + \frac{X_{k2}}{\|X_{k2}\|_2} \cdot \frac{\text{stop} - grad(X'_{k1})}{\|\text{stop} - grad(X'_{k1})\|_2}\right)$$

wherein $\|\cdot\|_2$ in formula (5) represents normalization $l_2$-norm;
a relationship between $X_{k1}$ and $X'_{k1}$, and a relationship between $X_{k2}$ and $X'_{k2}$ are shown in formula (8) and formula (9), respectively;

$$X'_{k1} = h(f(\text{transforms}(X_k))) \quad (6)$$

$$X'_{k2} = h(f(\text{transforms}(X_k))) \quad (7)$$

$$X_{k1} = z(X'_{k1}) \quad (8)$$

$$X_{k2} = z(X'_{k2}) \quad (9).$$

8. The method for fine-grained detection of driver distraction based on unsupervised learning according to claim 7, wherein before the loss function is constructed, a data augmentation is performed on the distracted driving image data, wherein the data augmentation comprises:
randomly cropping distracted driving images;
inverting the cropped images and modifying brightness and saturation of the images; and
converting the modified images to grayscale maps, and performing Gaussian blurring and normalization.

9. The method for fine-grained detection of driver distraction based on unsupervised learning according to claim 8, wherein each single block in the backbone network is constructed through the following steps:
cascading a 1×1 convolution and a 3×3 convolution;
inputting an output of a 3×3 convolutional layer to a pooling layer;
inputting an output of a pooling layer to a two-layer MLP structure;
adding up an output of the MLP structure and the output of the 3×3 convolutional layer to obtain a new feature map;
separately inputting the new feature map to a fully connected layer, a 1×1 convolutional layer, a 3×3 convolutional layer, and a 5×5 convolutional layer;
adding up outputs of the convolutional layers to another new feature map; and
inputting an other new feature map to a 3×3 convolutional layer, and then inputting an output of the 3×3 convolutional layer to a 1×1 convolutional layer.

10. The method for fine-grained detection of driver distraction based on unsupervised learning according to claim 9, wherein the distracted driving image data is analyzed by using the unsupervised learning detection model, to obtain a distraction detection result for assisting a driver in safe driving.

* * * * *